UNITED STATES PATENT OFFICE.

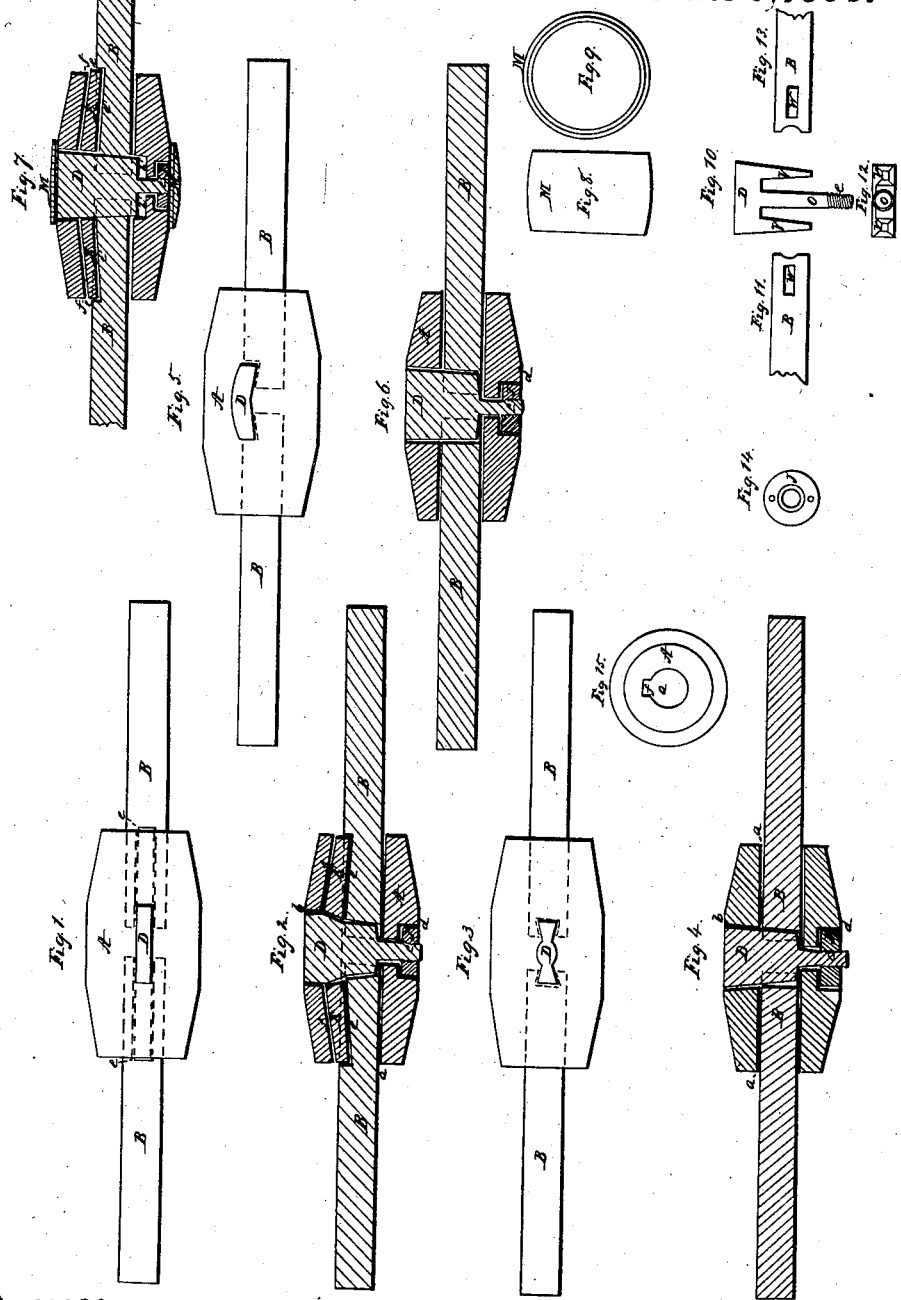

SAMUEL HALL, OF NEW YORK, N. Y.

COUPLING FOR SHAFTING.

Specification of Letters Patent No. 28,573, dated June 5, 1860.

*To all whom it may concern:*

Be it known that I, SAMUEL HALL, of New York, in the county and State of New York, have invented, made, and applied to use certain new and useful Improvements in the Mode of Coupling Shafts or Shafting or Rods Together; and I do declare the following to be a full, clear, and exact description of the same, reference being had to the accompanying drawings, and to the letters of reference marked thereon, in which—

Figure I is a top view of the central hub or coupling and wedge-key: the red lines show the inserted ends of the shafts, together with the taper wedge keys and key seat. Fig. II, a cut section of the same, showing the inserted wedge key and taper keys. Fig. III, a top view of the central hub or coupling and double dovetailed key—the red lines showing the inserted ends of shafts, dovetailed to correspond with the dovetail of the cross-key. Fig. IV, cut section of the same. Fig. V, top view of central hub or coupling & half dovetailed cross key—the red lines show the inserted ends of shafts, corresponding with cross-key. Fig. VI, cut section of the same. Fig. VII, a view of the coupling or central hub when the same is provided with an inside recess for the purpose hereinafter described. Fig. VIII, flat view of sleeve or band (M). Fig. IX, a view of the sleeve or band, sometimes employed as hereinafter specified. Fig. X, a view of a three pronged key, which may be inserted in the central hub or coupling and connect the shafts, shafting or rods together. Fig. XI shows, sections of shafts or shafting to be coupled, slotted to receive prongs of three pronged key shown in Fig. X. Fig. XII, bottom view of coupling or central hub, when the shafts or shafting are coupled by using three pronged key shown in Fig. X. Fig. XIV, view of screw driver threaded nut, used to hold cross key in position. Fig. XV, end view of center coupling or hub (A).

In the drawings similar parts of the invention are designated by the same letters.

The nature of my invention consists in the arrangement and construction of a new mode of coupling shafts, shafting, rods, or other articles to which the same can be applied, by which economy of time and labor is gained and the shafts, shafting, rods or other articles coupled are held together and secured in a strong, compact and substantial manner.

Another advantage arising from the use of my invention will be its perfect safety—as no bolts, screws, keys or other means usually used in couplings, if employed by me, are allowed to project and catch the belting, or clothing of the operatives.

To enable those skilled in the art to make and use my invention, I will proceed to describe its construction and operation.

In the drawings accompanying this application, four modes of coupling shafts or shafting &c, are shown. In each of these modes, I employ a central hub or coupling (A) provided with two openings (*a, a*) one on each end into which the shafts or portions of shafting (B, B) to be coupled are introduced. In the upper or top side of the central hub (A) is the slot (*b*) extending almost entirely through the same, into which the cross-key (D) is inserted. The opposite side of the central hub or coupling (A) is provided with a recess (*d*) into which a round forked screw-driver threaded nut (J) is inserted, and by being screwed on to the end of the cross-key (D) provided with a screw thread (*c*) for the purpose, keeps the cross-key (D) in position, neither end of the key (D) projecting above or below the face of the central hub or coupling (A). The shafts or portions of shafting (B, B) to be coupled are introduced into the openings (*a, a*) and are coupled and held in position in the following manner.

When I pursue the mode of coupling shown in Figs. I and II, the shafts or portions of shafting (B, B) to be coupled, are provided with an inclined slot (*e*) of sufficient length and width to accommodate a taper wedge key (E) introduced from the interior of the central hub or coupling (A). The central hub or coupling (A) is also provided with an inclined recess (*f*) on each side and of the same width and length as the key (E) employed. The shafts or portions of shafting (B, B) having been introduced into the central hub or coupling (A) through the openings (*a a*) are coupled and held firmly in position by the taper wedge keys (E, E) inserted from the interior of the center hub or coupling (A) and having their seats in the inclined slot (*e*) and fitting tightly and closely into the recess formed on each end of the center hub or coupling (A) and which keys (E, E) the cross-key (D) inserted into the slot (b) at the top side of the center hub or coupling (A) presses against with sufficient force and prevents thereby their loosening or changing position. These keys (E, E) are made tapering on their top and bottom sides or on one side only, for the purpose of being easily loosened, whenever it is desired to remove the shaft (B). In the other modes for coupling shown in the drawings, (see Figs. III, IV, V, VI, X, and XI) the use or employment of these taper keys (E, E) is dispensed with.

In one case, a double dovetailed cross key is shown, in another a half dovetailed key, and in the third mode, a three pronged key is employed. In each of these cases the cross-key (D) is inserted in the slot (b) in the center hub or coupling (A) and in the modes shown in drawings III, IV, V, and VI, fitting closely into the dovetailed ends of shafts (B, B) introduced into the center hub or coupling (A) as previously described, holds them firmly and securely and prevents their being drawn out, and acts in the place of the taper wedge keys (E, E) as described in the mode shown in Figs. I and II. When the three pronged key is employed, the ends of the shafts (B, B) introduced, are slotted a sufficient length, width and distance from each end (w) to admit the prongs (v, v) on each side of the three pronged key—while the third or center prong (o) passes through the coupling (A) and is held in position by the screw-driver threaded nut previously described.

Where large shafting is required I have found it desirable to provide a longitudinal key on each side of the shaft, or in other words, two keys for each shaft, inserted as shown in Figs. I and II, the shaft being slotted on each side to receive these diagonal keys. In such case the slot in the center hub or coupling A, is wedge-shaped, as shown in Fig. II, and instead of employing a nut (J) to keep the cross-key (D) in position, I use a sleeve or band (M) as it may be called, to slide over the center of the coupling (A). This sleeve or band (M) has a small hole drilled and countersunk in its center, to receive a countersunk head tap-bolt or set screw, passing into the coupling (A) a sufficient distance to keep the sleeve or band (M) in position.

I do not intend to confine myself to the use of any peculiarly shaped cross-key, as I am fully aware that the form of the same may be varied. It will be observed that for the purpose of securing the shaft (B) more firmly, the cross key (D) passes through the line of shafting into the recess b' as shown in Fig. VII.

What I claim as new and desire to secure by Letters Patent is—

The cross-key D, in combination with the slotted shafts B, B coupled within the center hub or coupling A, by means of the longitudinal keys E E, arranged and operated as herein described and for the purpose as specified.

SAMUEL HALL.

In presence of:
   JAMES D. VAN VOORHIS,
   A. SIDNEY DOANE.